March 1, 1955 J. DEPALLENS 2,703,156
FRICTIONAL SHOCK ABSORBER
Filed April 30, 1953 2 Sheets-Sheet 2
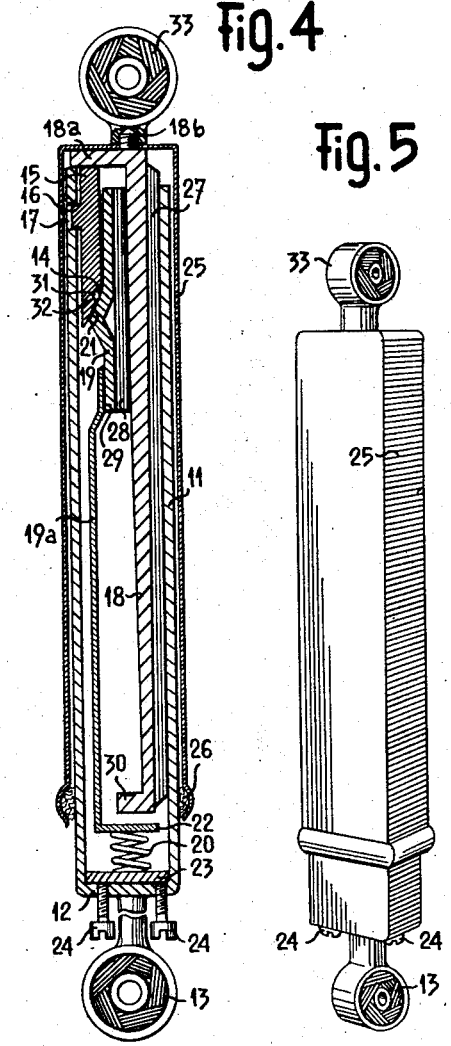
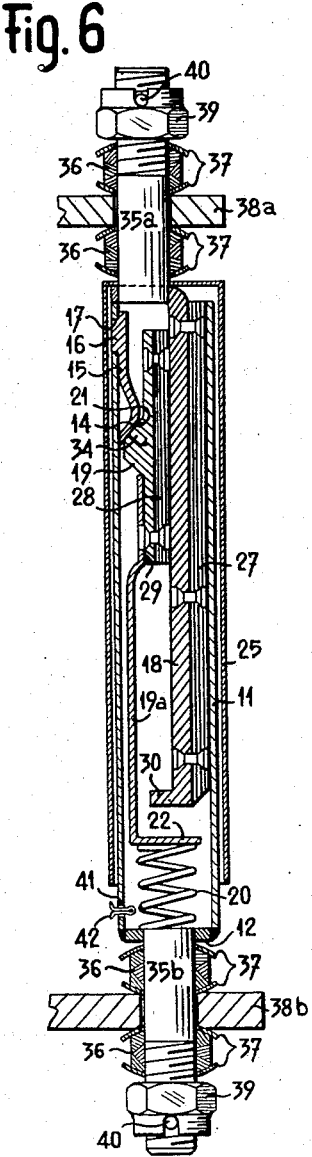
INVENTOR
JULES DEPALLENS United States Patent Office 2,703,156
Patented Mar. 1, 1955

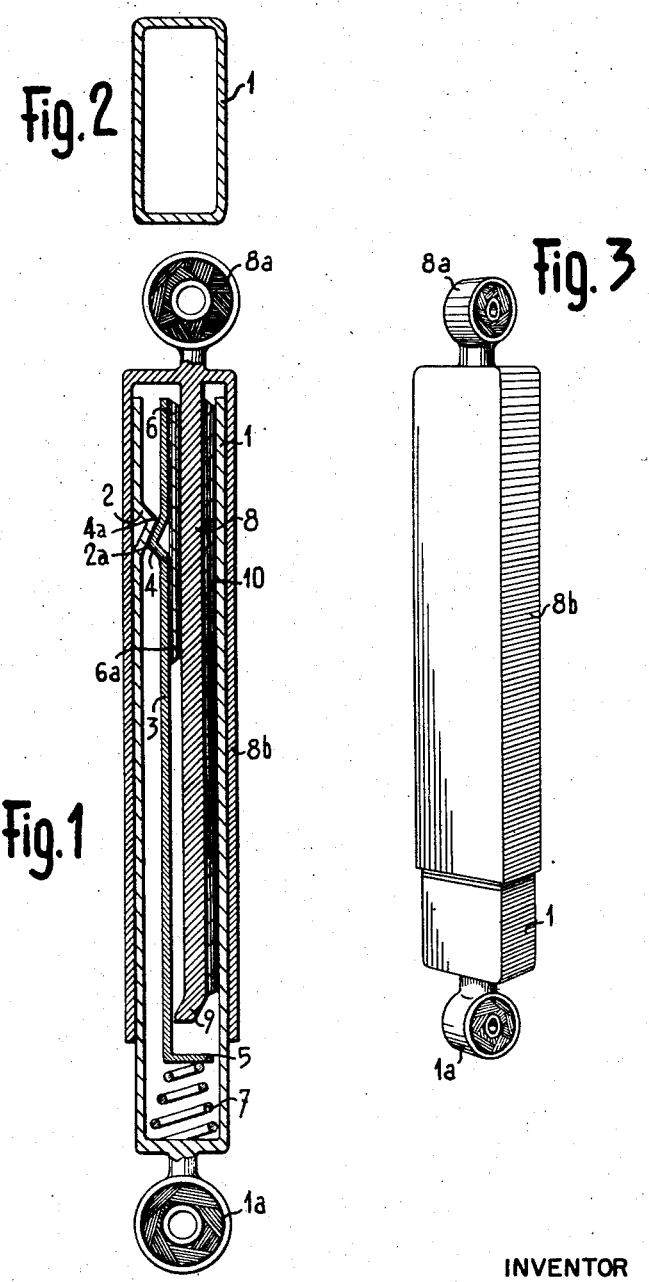

2,703,156

FRICTIONAL SHOCK ABSORBER

Jules Depallens, Pully, Switzerland

Application April 30, 1953, Serial No. 352,153

Claims priority, application Switzerland August 1, 1951

20 Claims. (Cl. 188—129)

The present invention relates generally to frictional shock-absorbers, and is particularly directed to frictional shock-absorbers for association with the suspension springs of motor vehicles to brake the return movement of the springs to their original condition after the suspension springs have been deflected, this being a continuation-in-part of my application Serial No. 250,885, filed October 11, 1951, now abandoned.

An object of the present invention is to provide a frictional shock-absorber for association with the suspension springs of the motor vehicle, wherein the shock-absorber offers little or no resistance to the original deflection of the associated springs from the normal condition of the latter, and only acts to frictionally brake the return movement of the springs after the latter have been deflected.

Another object is to provide a frictional shock-absorber of the described character which includes a sheath or sleeve open at one end and provided with securing means at its other end for attachment to the spring suspended element, such as, the wheel axle, a main blade telescopically extending into the sleeve through the open end of the latter and formed with means for attachment to the motor vehicle chassis or frame, friction lining on one side of the main blade to frictionally bear against the adjacent wall surface of the sleeve when the main blade is urged laterally in the direction toward that wall surface, an auxiliary blade member between the other side of the main blade and the interior surface of the sleeve, friction lining on at least a portion of the side of the auxiliary blade facing toward the main blade to frictionally bear against the latter when the auxiliary blade is urged laterally in the direction toward the main blade, a cooperating cam arrangement on the sleeve and the auxiliary blade to urge the latter laterally in the direction toward the main blade when the auxiliary blade is displaced longitudinally in the direction toward the open end of the sleeve, and spring means yieldably urging the auxiliary blade longitudinally in the direction toward the open sleeve end so that the movement of the main blade in the direction out of the sleeve is strongly resisted by the frictional action of the friction lining against the wall surface of the sleeve and against one face of the main blade.

Another object is to provide a frictional shock-absorber having the foregoing structural characteristics and wherein the cam arrangement is constructed to promote even contact of the friction lining on the auxiliary blade with the adjacent face of the main blade for obtaining a strong braking action and uniform wearing of the friction lining.

A further object of the present invention is to provide a frictional shock-absorber having the foregoing structural characteristics, wherein the cam arrangement includes struck-out oppositely sloped portions on the sleeve and the auxiliary blade.

A further object is to provide a frictional shock-absorber having the foregoing structural characteristics and wherein the portion of the cam arrangement carried by the sleeve is removable from the latter to permit disassembly of the several parts making up the shock-absorber.

A still further object is to provide a shock-absorber having the foregoing structural characteristics, and wherein the main blade tapers in thickness along the length thereof to vary the frictional resistance to movement of the main blade out of the sleeve as the main blade is withdrawn.

A still further object is to provide a shock-absorber having the foregoing structural characteristics, and wherein means are provided for reducing the frictional resistance between the parts of the cam arrangement on the auxiliary blade and the sleeve to ensure proper operation of the frictional shock-absorber under all conditions.

The above, and other, objects, features and advantages of the present invention will be manifest in the detailed description of various illustrative embodiments which follows herein and which is to be read in connection with the accompanying drawings forming a part hereof and wherein:

Fig. 1 is a longitudinal sectional view of a frictional shock-absorber constructed in accordance with one embodiment of the present invention;

Fig. 2 is a transverse sectional view of a sleeve element forming a part of the embodiment of Fig. 1;

Fig. 3 is a perspective view, on a reduced scale, of the embodiment of Fig. 1;

Fig. 4 is a longitudinal sectional view similar to Fig. 1, but showing a frictional shock absorber constructed in accordance with another embodiment of the present invention;

Fig. 5 is a perspective view, on a reduced scale, of the embodiment of Fig. 4; and Fig. 6 is a longitudinal sectional view similar to Fig. 4, but showing a frictional shock-absorber constructed in accordance with still another embodiment of the present invention.

Referring to the drawings in detail, and initially to Figs. 1, 2 and 3 thereof, a frictional shock-absorber embodying the present invention is there illustrated and includes a tubular sleeve or sheath 1. The sheath 1 is formed with at least two opposed parallel wall portions, and is preferably of rectangular cross-section, as shown in Fig. 2. The sheath or sleeve 1 is open at one end and at its other closed end has an attachment 1a for securing that end of the sleeve to the spring suspended member, for example, to a wheel axle or to the fitting securing the suspending spring to the wheel axle.

A main or principal elongated blade 8 extends into the sleeve 1 through the open end of the latter and is provided with a frictional lining 10 on one side or flat surface thereof for frictional braking contact with the confronting portion of the interior surface of the sleeve 1. The main blade 8 is provided at its outer or upper end with an attachment 8a, which may be in the form of a ring as shown, for securing the related end of the main blade to the chassis or frame of the associated motor vehicle. A sheath or outer cover 8b is formed integral with the main blade 8 and is open at the end remote from the attachment 8a to telescope freely over the sleeve 1.

An auxiliary blade 3 is disposed loosely within the sleeve 1 at the side of the main blade 8 remote from the frictional lining 10 on the latter. The auxiliary blade 3 has a frictional lining 6 on the side thereof facing toward the main blade 8 and extending along the portion of the auxiliary blade adjacent the open end of the sleeve 1. Thus, when the auxiliary blade 3 is urged laterally against the main blade 8, the frictional lining 6 acts on the confronting surface of the main blade and the latter is urged laterally to apply the frictional lining 10 against the confronting side wall surface of the sleeve 1 so that the frictional linings 6 and 10 both oppose the longitudinal movement of the main blade relative to the sleeve 1.

In order to effect lateral displacement of the auxiliary blade 3 toward the main blade 8 in response to the withdrawal of the main blade from the sleeve 1, the side wall portion of the sleeve 1 and the auxiliary blade 3 are formed with integral cam projections 2 and 4, respectively. The cam projection 4 on the auxiliary blade is located approximately midway between the ends of the frictional lining 6 on the auxiliary blade and is formed with a sloped surface 4a which inclines toward the adjacent portion of the wall surface of sleeve 1 in the direction away from the open end of the latter. The corresponding cam projection 2 on the wall surface of the sleeve 1 projects inwardly toward the auxiliary blade, and is formed with a sloped surface 2a extending substantially parallel to the sloped surface 4a of the cam projection on the auxiliary blade and at a location to slidably contact the surface 4a.

The inner end of the auxiliary blade 3 is laterally bent to provide a flange 5, and a spring 7 under compression is interposed between the flange 5 and the adjacent closed end of the sleeve 1. The spring 7 yieldably urges the auxiliary blade 3 in the longitudinal direction toward the open end of the sleeve 1 and the cam projections 2 and 4 cooperate to translate this longitudinal biasing into a lateral force applying the auxiliary blade 3 against the main blade 8. Finally, the inner end of the main blade 8 is bent laterally in the direction toward the auxiliary blade 3, as at 9, to contact the inner end 6a of the frictional lining 6 on the auxiliary blade when the main blade is withdrawn to its full extend from the sleeve 1.

When the frictional shock-absorber of Figs. 1, 2 and 3 is employed in association with the spring suspension of a vehicle, the attachment 1a is secured in a suitable manner to the suspended member, for example, the associated wheel axle, and the attachment 8a is secured to the chassis or frame of the vehicle, and the operation of the shock-absorber is as follows:

When the vehicle encounters an uneven portion of the road surface causing compression of the suspension spring, the attachments 1a and 8a are moved toward each other and the main blade 8 penetrates into the sleeve 1. Such movement of the main blade 8 is partially transmitted to the auxiliary blade 3 in opposition to the action of the spring 7 and by reason of the contact of the lining 6 on the auxiliary blade with the main blade so that the sloped surfaces 2a and 4a of the cam projections move relative to each other in the direction relieving the lateral pressure of the auxiliary blade 3 against the main blade 8. Thus, during the longitudinal movement of the main blade 8 in the direction into the sleeve 1, there is little or no normal pressure exerted by the frictional linings 6 and 10 against the confronting surfaces of the main blade 8 and sleeve 1, respectively, so that the frictional resistance to such movement of the main blade 8 relative to the sleeve is correspondingly slight.

However, when the suspension springs associated with the shock-absorber return to the normal or equilibrium condition thereof, the main blade 8, starting from a position deep within the sleeve 1, as in Fig. 1, is partially withdrawn from the sleeve. During such withdrawal of the main blade 8, the spring 7 and cam projections 2 and 4 act to urge the auxiliary blade 3 against the main blade and the frictional lining 6 enages the main blade so that the latter exerts a longitudinal force or reaction upon the auxiliary blade in the same direction as the spring 7 and the cam projections translate the combined longitudinal forces of the spring 7 of the reaction between the lining 6 and the main blade into an intense lateral force applying the lining 6 against the main blade and in turn applying the lining 10 on the main blade against the confronting internal surface of the sleeve 1. Thus, the linings 6 and 10 will exert a relatively strong frictional resistance to withdrawal of the main blade from within the sleeve 1, and the relative movement of the main blade relative to the sleeve is arrested when they have returned to their initial position with the associated suspension springs in their normal or equilibrium condition.

Further, complete removal of the main blade 8 from within the sleeve 1 is prevented by engagement of the bent inner end 9 of the main blade against the end 6a of the frictional lining on the auxiliary blade. Such engagement directly limits the longitudinal movement of the main blade in the direction withdrawing the blade from the sleeve 1 and, after the bent end 9 has engaged the end edge 6a of the lining, any further pull on the main blade is reflected, by the action of the cam projections 2 and 4, in an increased lateral force exerted by the auxiliary blade against the main blade to assist in preventing complete withdrawal of the main blade.

Referring now to Figs. 4 and 5 of the drawings, another embodiment of the present invention is there illustrated and includes a sheath or sleeve 11 which is preferably of rectangular cross-section and is open at one end. The other end of the sleeve 11 is closed by an end wall 12 and an attachment 13, which may be in the form of a ring as shown, extends from the end wall 12 for securing the sleeve 11 to the suspended member, for example, to the wheel axle.

A main blade 18 telescopes into the sleeve 11 and at its outer end is formed with a lateral flange 18a having a stud 18b projecting upwardly therefrom. An outer sleeve 25 is formed of rectangular cross-section and is open at its lower end to telescope freely over the sleeve 11. The end wall of the outer sleeve 25 is formed with a suitable opening receiving the stud 18b and an attachment 33, which may be in the form of an eye or ring, as shown, is threaded on the stud 18b to secure the outer sleeve 25 to the main blade 18. The attachment 33 is provided for the purpose of securing the main blade 18 to the chassis or frame of the associated vehicle.

The lower or open end edge of the outer sleeve 25 is bent to define an inwardly opening channel in which a porous seal or packing 26 is disposed to prevent the entry of dust and dirt into the interior of the shock-absorber and also to prevent direct contact between the inner sleeve 11 and the outer sleeve 25 during the telescopic extension and retraction of said sleeves 11 and 25 to reduce functional noise.

As in the previously described embodiment of the invention, the main blade 18 has a frictional or brake lining 27 on one surface thereof for frictionally engaging the adjacent portion of the wall surface of the sleeve 11, and an auxiliary blade assembly is disposed within the sleeve 11 at the side of the main blade remote from the lining 27. In the embodiment of Figs. 4 and 5, the auxiliary blade assembly includes an auxiliary blade shoe 19 adjacent the open end of the sleeve 11, and an extension 19a secured to the shoe 19 by suitable means (not shown) and extending therefrom in the direction toward the closed end of the sleeve 11. The extension 19a, at its free end, is formed with a laterally bent flange 22, and a coil spring 20, under compression, is interposed between the flange 22 and an adjustable abutment plate 23. Adjustment screws 24 extend through the end wall 12 of the sleeve 11 and bear against the abutment plate 23 so that, by more or less extending the screws 24 through the end wall 12, the compression of the spring 20, and the longitudinal force exerted by the latter on the auxiliary blade assembly, can be adjusted.

The auxiliary blade shoe 19 has a frictional lining 28 on the one side thereof facing toward the main blade 18 for frictional contact with the confronting surface of the latter, and the inner or free end of the main blade 18 is formed with a lateral flange or foot 30 which is adapted to engage the inner end edges 29 of the shoe 19 and lining 28 for preventing complete withdrawal of the main blade from the sleeve 11, as in the previously described embodiment.

In the embodiment of Figs. 4 and 5, the cam arrangement provided for translating longitudinal movement of the auxiliary blade assembly toward the open end of the sleeve 11 into a lateral displacement of the shoe 19 and its lining 28 toward the main blade 18 includes a cam projection 21 on the auxiliary blade shoe 19, which may be struck or stamped from the latter and provides a sloping cam surface similar to the surface 4a of the first described embodiment, and a removable cam member 15 which may be machined from bar stock and fits between the auxiliary blade shoe 19 and the adjacent wall of the sleeve 11. The cam member 15 is formed with an obliquely cut end defining a sloped cam surface 14, similar to the cam surface 2a of the first described embodiment, and has a projection or lug 16 extending from the side thereof and received in a suitably shaped recess or cutout 17 formed in the adjacent side wall of the sleeve 11 to prevent longitudinal movement of the cam member 15 relative to the sleeve 11. The several parts are dimensioned so that, when the cam surfaces 14 and 21 are longitudinally separated, there is sufficient lateral clearance between the confronting surfaces of the shoe 19 and the cam member 15 to permit lateral displacement of the latter away from the adjacent wall of the sleeve 11 for withdrawing the lug 16 from the cutout 17, thereby allowing longitudinal removal of the cam member 15 for disassembly of the main blade 18, the outer sleeve 25 and the auxiliary blade assembly from the sleeve 11. However, normally the spring 20 acting upwardly on the auxiliary blade assembly causes the cooperating cam surfaces 14 and 21 to urge the cam member 15 laterally against the adjacent wall of the sleeve 11 for maintaining the lug 16 in the cutout 17.

In order to reduce the friction between the cam surfaces 14 and 21, and thereby to ensure the response of the shock-absorber to even slight deflections of the associated suspension springs, the embodiment of Figs. 4 and 5 employs an anti-friction roller bearing 31 which is seated in a suitable recess 32 in the surface 14 of the cam member 15 and effects rolling contact with the cam surface 21 of the auxiliary blade shoe. In addition to reducing the friction between the cooperating cam surfaces, the roller or anti-friction bearing 31 permits rocking of the auxiliary blade shoe 19 to ensure uniform contact between all of the frictional lining 28 thereon and the confronting surface of the main blade 18.

Finally, in the embodiment of Figs. 4 and 5, the main blade 18 diminishes in cross-section toward the free end thereof so that, as the main blade is withdrawn from the sleeve 11 by the return of the associated suspension springs to their normal or equbrium condition, the frictional force resisting such return compensates for the reduction of the spring force exerted by the suspension springs when the latter approach their normal condition. With the above exception, the embodiment of Figs. 4 and 5 operates in substantially the same manner as has been described in detail in connection with the form of the invention shown in Figs. 1, 2 and 3.

It is to be noted that, according to the form given to the blade 18, the decreasing thickness of said main blade 18 has also for effect to compensate the increase of the frictional resistance under the combined action of the cam surfaces 14 and 21 and of the spring 20, so that the resulting frictional resistance may be maintained practically constant in any point of the withdrawal movement of the main blade 18.

Referring now to Fig. 6 of the drawings, wherein still another embodiment of the present invention is illustrated, it will be seen that the frictional shock-absorber there shown is generally similar to the device described in connection with Figs. 4 and 5 and, accordingly, the same reference numerals are used to designate the corresponding parts of the two embodiments.

In Fig. 6, the structure provided for securing the main blade 18 to the chassis or frame 38a of the associated vehicle includes a bolt 35a extending longitudinally from the main blade through a suitable opening in the frame or chassis and having a nut 39 threaded thereon above the frame or chassis member 38a. A cushioning ring or washer 36 formed, for example, of rubber, and interposed between rigid washers 37, is provided on the bolt 35a between the end wall of the outer sleeve 25 and the member 38a and between the latter and the nut 39. The nut 39 is tightened down on the bolt 35a and then locked in position, for example, by a cotter pin 40.

The structure provided in Fig. 6 for securing the sleeve 11 to the movable or suspended member 38b is substantially the same as that described above and includes a bolt 35b extending downwardly from the end wall 12 of the sleeve and through the member 38b with cushioning and rigid washers 36 and 37, respectively, being provided on the bolt 35b and held on the latter by a nut 39 and locking element or pin 40.

The sleeve 11 is also preferably formed with a drain hole 41 to permit the escape of moisture collecting in the sleeve 11, and a cotter pin 42 may extend loosely through the drain hole to act as a stop for moisture entrance in the sleeve 11.

As a further distinction from the form of the invention shown in Figs. 4 and 5, the cam member 15 of Fig. 6 is stamped or bent from sheet material, rather than being machined from bar stock, while the auxiliary blade shoe 19 is a machined or cast solid member and has a bore 34 formed therein and opening at the cam surface 14 to act as a grease cup and contain a lubricant for decreasing the friction between the cam surfaces 14 and 21. While the main blade 18 of Fig. 6 is shown with a constant thickness throughout the length thereof, it is to be understood that such thickness may be progressively reduced toward the free end of the blade, as in the case of the blade 18 of Fig. 4. In a modified form of the shock-absorber the thickness of the main blade 18 may be constant and the thickness of the lining 27 may be progressively reduced toward the free end of the blade 18 to obtain the same effect as in the embodiment shown in Fig. 4. In any event, the cam member 15 of Fig. 6 is also removable to permit disassembly of the parts, and the device therein illustrated operates substantially in the same manner as the shock-absorber described in connection with Figs. 1, 2 and 3.

While several specific embodiments of the invention have been described herein and shown in the drawings, by way of example, it is to be understood that the present invention is not limited to these precise embodiments and that various changes and modifications may be effected therein by one skilled in the art without departing from the scope or spirit of the invention as defined in the appended claims.

What is claimed is:

1. A frictional shock-absorber of the described character for association with two relatively movable members having a spring suspension therebetween; said frictional shock-absorber comprising an inner sleeve open at one end and having means at the other end thereof for attachment to one of the relatively movable members, a main elongated blade member extending telescopically into said inner sleeve through the open end of the latter and having means at the outer end of said main blade for attachment to the other of the relatively movable members, a first frictional lining on one side of said main blade member for frictional contact with the adjacent wall surface of said inner sleeve, an auxiliary blade member in said inner sleeve at the other side of said main blade member, a second frictional lining on at least a portion of the face of said auxiliary blade member directed toward said main blade member for frictional contact with the latter, and cooperating cam means on said auxiliary blade member and said inner sleeve, respectively, resilient means yieldably urging said auxiliary blade member in a direction parallel to the longitudinal axis of the inner sleeve, said cam means and said resilient means being operative to laterally urge said auxiliary blade member in the direction toward said main blade member in response to longitudinal displacement of said main blade member in one direction relative to said inner sleeve so that such relative longitudinal displacement is frictionally resisted by the engagement of said first lining with said sleeve and the engagement of said second lining with said main blade member.

2. A frictional shock-absorber according to claim 1; wherein said cooperating cam means define engageable cam surfaces which incline in the direction toward said open end of the inner sleeve and toward said main blade member so that the frictionally resisted relative longitudinal displacement of said main blade member and said inner sleeve is in the direction effecting withdrawal of said main blade member from the sleeve.

3. A frictional shock-absorber according to claim 2; wherein said resilient means yieldably urge said auxiliary blade member in the longitudinal direction toward said open end of the inner sleeve for lateral displacement of said auxiliary blade member by said cam surfaces in the direction toward said main blade member and so that, during longitudinal movement of said main blade member into said inner sleeve, said main blade member frictionally urges said auxiliary blade member in the longitudinal direction separating said cam surfaces and against the force exerted by said resilient means to reduce the frictional resistance to movement of said main blade member into said inner sleeve.

4. A frictional shock-absorber according to claim 3; wherein said auxiliary blade member has a lateral flange on the end thereof adjacent said other end of the inner sleeve, said other end of the inner sleeve being closed by an end wall, and said resilient means includes a coil spring under compression between said lateral flange and said end wall of the inner sleeve.

5. A frictional shock-absorber according to claim 3; wherein said auxiliary blade member has a lateral flange on the end thereof adjacent said other end of the inner sleeve, said inner sleeve having an end wall closing said other end thereof, a transverse abutment plate in said inner sleeve between said end wall and said lateral flange, and screw means extending through said end wall and bearing against said abutment plate for adjustably spacing the latter from said end wall; and wherein said resilient means includes a coil spring under compression between said lateral flange of the auxiliary blade member and said transverse abutment plate so that adjustment of the spacing of the latter from said end wall varies the longitudinal force applied by said resilient means against said auxiliary blade member.

6. A frictional shock-absorber according to claim 1; wherein said auxiliary blade member has a lateral shoulder thereon facing opposite to said one longitudinal direction, and said main blade member is laterally bent at the inner end thereof in the direction toward said auxiliary blade member and engages said lateral shoulder to limit the relative longitudinal movement of said main blade member and said inner sleeve in said one direction.

7. A frictional shock-absorber according to claim 1; further comprising an outer sleeve arranged for longitudinal movement with said main blade member, said outer sleeve having an open end and telescoping over said inner sleeve member.

8. A frictional shock-absorber according to claim 7; wherein said outer sleeve defines an inwardly opening circumferential channel adjacent said open end thereof, and a packing of porous material in said channel to exclude dirt from entrance between said inner and outer sleeves and to prevent direct contact between said inner and outer sleeves during their relative telescopic movements, to reduce functional noise.

9. A frictional shock-absorber according to claim 1; wherein the thickness of said main blade member varies along the length thereof to provide a varying resistance to relative longitudinal movement of said main blade member and said inner sleeve in said one direction during said relative longitudinal movement.

10. A frictional shock-absorber according to claim 1; wherein said cooperating cam means define engageable cam surfaces which incline in the direction toward said open end of the inner sleeve and toward said main blade member so that the frictionally resisted relative longitudinal movement of said main blade member and said inner sleeve is in the direction effecting withdrawal of said main blade member from said inner sleeve; and wherein the thickness of said main blade member decreases progressively toward the inner end of the latter so that said frictional resistance to withdrawal of the main blade member from the inner sleeve tends to decrease progressively as said main blade member is withdrawn to compensate the increase of said frictional resistance under the combined action of the cam means and of the resilient means, so that the resulting frictional resistance be maintained practically constant in any point of the withdrawal movement of the main blade.

11. A frictional shock-absorber according to claim 1; wherein said cam means are integral with said inner sleeve and said auxiliary blade member, respectively, and include inclined and engageable cam surfaces stamped from said inner sleeve and auxiliary blade member.

12. A frictional shock-absorber according to claim 1; wherein said cam means define cam surfaces fixed longitudinally relative to said inner sleeve and said auxiliary blade member and engaging at a location substantially in lateral alignment with the center of area of said second frictional lining so that the latter is urged against said main blade member with a pressure that is uniform for all portions of said second frictional lining.

13. A frictional shock-absorber according to claim 12; including anti-friction means between said cam surfaces so that the shock-absorber is sensitive to slight and gradual relative longitudinal displacement of said inner sleeve and main blade member in said one direction.

14. A frictional shock-absorber according to claim 13; wherein said anti-friction means includes a roller bearing, one of said cam surfaces having a recess therein rotatably receiving said roller bearing with said roller bearing rolling on the other of said cam surfaces.

15. A frictional shock-absorber according to claim 13; wherein said anti-friction means includes a grease cup forming recess in one of said cam surfaces to contain a lubricant for discharge between said cam surfaces.

16. A frictional shock-absorber according to claim 1; wherein said cam means include a first cam surface formed on said auxiliary blade member and facing away from said main blade member, a cam member between said auxiliary blade member and said inner sleeve, said cam member having a second cam surface at one end thereof inclined parallel to said first cam surface, and laterally separable means on said inner sleeve and said cam member for holding the latter against longitudinal displacement relative to said inner sleeve.

17. A frictional shock-absorber according to claim 16; wherein said laterally separable means includes a lateral projection on said cam member and an inwardly opening recess in said inner sleeve formed to receive said lateral projection.

18. A frictional shock-absorber according to claim 17; wherein said first and second cam surfaces incline toward said main blade member and the open end of said inner sleeve and said cam member extends from said one cam surface forming end thereof toward said open end of the inner sleeve, said inner sleeve being formed so that a lateral clearance at least as large as the width of said lateral projection on the cam member is provided between said cam member and said auxiliary blade member to permit removal of said lateral projection from said recess of the inner sleeve for withdrawal of said cam member through said open end of the inner sleeve.

19. A frictional shock-absorber according to claim 18; wherein said resilient means yieldably urge said auxiliary blade member in the longitudinal direction pressing said first cam surface against said second cam surface to laterally urge said cam member against the surface of said inner sleeve and thereby maintain said lateral projection of the cam member in said recess of the inner sleeve.

20. A frictional shock-absorber according to claim 19; wherein said auxiliary blade member includes a rigid blade shoe member carrying said second frictional lining on a face thereof, and a longitudinal extension secured to said shoe member and having a laterally bent free end portion against which said resilient means acts.

References Cited in the file of this patent

UNITED STATES PATENTS

| 1,713,515 | Bechereau | May 21, 1929 |
| 2,444,337 | Cottrell | June 29, 1948 |

FOREIGN PATENTS

| 195,880 | Great Britain | Apr. 12, 1923 |